United States Patent [19]

White et al.

[11] Patent Number: 5,057,555

[45] Date of Patent: Oct. 15, 1991

[54] MULTI-COMPONENT COATING COMPOSITION COMPRISING AN ANHYDRIDE CONTAINING POLYMER, A GLYCIDYL COMPONENT AND A POLYMER WITH MULTIPLE HYDROXYL GROUPS

[76] Inventors: Donald A. White, 23 Lorkim La., Atco, N.J. 08004; Robert J. Barsotti, R.D. 2, Box 163 A, Coles Mill Rd., Franklinville, N.J. 08322; Patrick H. Corcoran, 25 Laurel Hill Dr., Cherry Hill, N.J. 08003; Lili W. Altschuler, 538 Northwynwood Ave., Wynwood, Pa. 19096

[21] Appl. No.: 477,178

[22] Filed: Feb. 8, 1990

Related U.S. Application Data

[63] Continuation of Ser. No. 212,052, Jun. 27, 1988, abandoned.

[51] Int. Cl.$^5$ .................. C08K 5/01; C08K 5/10; C08L 63/02
[52] U.S. Cl. ..................... 523/400; 523/437; 523/439; 525/74; 525/108; 525/113; 525/116; 525/117; 525/118; 525/119; 525/207; 525/208; 525/221; 525/94
[58] Field of Search ............... 523/400, 437, 439; 525/74, 108, 113, 116, 117, 118, 119, 207, 208, 221

[56] References Cited

U.S. PATENT DOCUMENTS

| | | | |
|---|---|---|---|
| 3,136,736 | 6/1964 | Washburne et al. | 525/119 |
| 3,509,086 | 4/1970 | Rohrbacher | 523/400 |
| 3,803,111 | 4/1974 | Munro et al. | 528/493 |
| 3,969,327 | 7/1976 | Stein et al. | 525/108 |
| 4,038,454 | 7/1977 | Lehman | 525/371 |
| 4,056,506 | 11/1977 | Heilman et al. | 523/439 |
| 4,452,948 | 6/1984 | Marrion et al. | 525/207 |
| 4,507,411 | 3/1985 | Gordon et al. | 523/436 |
| 4,657,975 | 4/1987 | Kodama et al. | 525/74 |
| 4,732,791 | 3/1988 | Blackburn et al. | 427/407 |
| 4,816,500 | 3/1989 | Corcoran | 523/437 |

FOREIGN PATENT DOCUMENTS

| | | | |
|---|---|---|---|
| 0661943 | 4/1963 | Canada | 523/439 |
| 0123793 | 11/1984 | European Pat. Off. | |
| 2853671 | 6/1980 | Fed. Rep. of Germany | 525/108 |
| 0994881 | 6/1965 | United Kingdom | |

*Primary Examiner*—Earl Nielsen
*Assistant Examiner*—Frederick Krass

[57] ABSTRACT

A coating composition useful for a finish for automobiles and trucks in which the film forming binder contains reactive binder components of about (a) 25-90% by weight, based on the weight of the binder, of an acrylic polymer having at least two reactive anhydride groups composed of polymerized monomers of an ethylenically unsaturated anhydride and polymerized monomers from the group consisting of alkyl methacrylate, alkyl acrylate and any mixtures thereof, wherein the alkyl groups have 1-8 carbon atoms and the polymer has a weight average molecular weight of about 2,000-50,000;

5-50% by weight, based on the weight of the binder, of a glycidyl component having at least two reactive glycidyl groups;

5-50% by weight, based on weight of the binder, of a polymeric component containing multiple hydroxy groups; and the composition contains about 0.1-5% by weight; based on the weight of the binder, of a catalyst.

17 Claims, No Drawings

MULTI-COMPONENT COATING COMPOSITION COMPRISING AN ANHYDRIDE CONTAINING POLYMER, A GLYCIDYL COMPONENT AND A POLYMER WITH MULTIPLE HYDROXYL GROUPS

REFERENCE TO RELATED APPLICATION

This is a continuation of application Ser. No. 212,052, filed June 27, 1988, now abandoned.

This invention is related to a multi-component coating composition.

There are a wide variety of multi-component coating compositions available for finishing substrates. Typically with these compositions, the components are mixed together before application and then the resulting composition is applied by conventional techniques such as spraying and the composition is cured at ambient temperatures or can be cured at elevated temperatures. These compositions are used to finish original equipment, automobiles and trucks, refinish automobiles and trucks, paint structures such as bridges and buildings, paint appliances, metal cabinets and the like.

Representative of such compositions are shown in the following patents:

Gordon et al. U.S. Pat. No. 4,507,411, issued Mar. 26, 1985 shows a two component composition of a functionalized polymeric component and glycidyl component that in the presence of an amine, alcohol, ketimine, acetal or oxazolidine cures at ambient temperatures. However, the compositions disclosed are not useful for finishes for automobiles and trucks.

European Patent Application 0,123,793 shows a two component composition in which one component has an anhydride ring that is opened with an amine and has a second component that contains glycidyl groups. Finishes formed from such compositions are not useful for automobiles and trucks since the finishes whiten and blister on exposure to high humidity conditions and exhibit recoat lifting when repaired within several days after the finish has been applied.

U.S. Pat. No. 3,136,736 issued June 9, 1964 to Wyncote et al and British patent 994,881 assigned to Rohm & Haas concern coating compositions comprising polyepoxides and maleic anhydride copolymers. The patents do not teach or suggest the use of a hydroxy functional material.

U.S. Pat. No. 4,732,791 issued Mar. 22, 1988, to Blackburn et al concerns a coating composition comprising polyepoxides, a monomeric anhydride curing agent and a low number average molecular weight hydroxyl group containing polyfunctional material. However, the composition disclosed must be heated to cure and contains monomeric anhydrides rather than polymeric anhydrides.

There is a need for a coating composition that cures at ambient temperatures and provides a high quality finish that is useful as an exterior finish or refinish for automobiles and trucks that has excellent adhesion to the substrate to which it is applied, good outdoor weatherability and humidity resistance and an excellent appearance.

Furthermore, because of environmental concerns about volatile organic components (VOC's) there is a need for such a coating composition with a high solids content which retains its sprayability. Many previous multi-component coating compositions have had to have a solids content of less than 35 percent to ensure sprayability. There is a need for a sprayable coating composition with a solids content of greater than 55 percent which retains an excellent mix of other desirable coating composition qualities such as pot life, hardness, durability and humidity resistance.

SUMMARY OF THE INVENTION

A coating composition containing 20–80% by weight of reactive binder components and 80–20% by weight of an organic carrier:
the binder contains
  (a) an anhydride acrylic polymer having at least two anhydride groups and having a weight average molecular weight of about 2,000–50,000;
  (b) a component having at least two reactive glycidyl groups; and
  (c) a polymeric component containing multiple hydroxyl groups; and
the composition contains about 0.1–5% by weight, based on the weight of the binder, of a catalyst.

DETAILED DESCRIPTION OF THE INVENTION

The film forming binder of the coating composition of this invention contains components that are mixed together before application. The film forming binder content of the composition is about 20–80% by weight of an organic carrier which usually is a solvent for the binder.

The composition forms an excellent clear coating over colored pigmented finishes. The coating has good adhesion to the pigmented finish, has excellent humidity resistance and is weatherable and durable. The composition is useful for finishing and refinishing the exterior of automobiles and trucks and the composition can be pigmented to form a colored finish. Also, the composition can be used over plastic substrates used in automobiles and trucks such as filler panels, side panels, fender extensions, moldings and other trim parts.

The composition also can be pigmented to form a colored finish. These pigmented compositions are useful as exterior original equipment and refinish coatings for automobiles and trucks, as maintenance coatings for tanks, bridges, buildings such as factories and oil refineries and as industrial coatings for appliances, metal cabinets, shelves and the like.

Preferably, the coating composition has a high solids content and contains about 40–80% by weight binder and 20–60% by weight of organic solvent. The binder of the composition contains about 25–90% by weight of anhydride acrylic polymer containing at least two anhydride groups, 5–50% by weight of a glycidyl containing component, and 5–50% by weight of a polymeric component containing multiple hydroxyl groups.

The anhydride acrylic polymer has a weight average molecular weight of about 2,000–50,000 determined by gel permeation chromatography using polymethyl methacrylate as a standard and preferably, has a weight average molecular weight of 3,000–25,000.

The anhydride acrylic polymer is prepared by conventional techniques in which the monomers, solvent, and conventional catalysts such as t-butyl perbenzoate are charged into a polymerization vessel and heated to about 75–200° C. for about 0.5–6 hours to form the polymer.

The anhydride acrylic polymer is formed by polymerizing monomers of alkyl methacrylates, or alkyl acrylates or mixtures thereof, where the alkyl groups have 1-12 carbon atoms and ethylenically unsaturated anhydrides (or ethylenically unsaturated dicarboxylic acids which are converted to the acid anhydride during the polymerization). Optionally, the anhydride acrylic polymer can contain other components such as styrene, α-methyl styrene, acrylonitrile, methacrylonitrile in amounts of about 0.1-50% by weight.

Typical alkyl acrylates and methacrylates that can be used to form the anhydride acrylic polymer are as follows: methyl methacrylate, ethyl methacrylate, propyl methacrylate, butyl methacrylate, pentyl methacrylate, hexyl methacrylate, octyl methacrylate decyl methacrylate, lauryl methacrylate, methyl acrylate, ethyl acrylate, propyl acrylate, butyl acrylate, octyl acrylate, nonyl acrylate, decyl acrylate, lauryl acrylate and the like. Other components that can be used to form the anhydride acrylic polymer are acrylamide, methacrylamide, acrylo alkoxy silanes such as gamma methacryloyl propyl trimethoxy silane. Also the anhydride acrylic polymer can contain about 0.1-5% by weight of an ethylenically unsaturated acid such as acrylic acid, methacrylic acid, itaconic acid, maleic acid and the like.

Typically useful ethylenically unsaturated anhydrides are as follows: itaconic anhydride, maleic anhydride, isobutenyl succinic anhydride and the like. It is also possible to impart the anhydride functionality to the anhydride acrylic polymer by using the appropriate ethylenically unsaturated dicarboxylic acid which converts to the corresponding acid anhydride by simple heating. Ethylenically unsaturated dicarboxylic acids that can be used are itaconic acid, maleic acid, isobutenyl succinic acid and the like.

Preferred anhydride acrylic polymers are as follows: styrene/butyl methacrylate/butylacrylate/itaconic anhydride, methyl methacrylate/butyl acrylate/itaconic anhydride, butyl acrylate/styrene/maleic anhydride/maleic acid, methyl methacrylate/butyl acrylate/itaconic anhydride.

The glycidyl component contains at least two glycidyl groups and can be an oligomer or a polymer. Typical glycidyl components are as follows: sorbitol polyglycidyl ether, mannitol polyglycidyl ether, pentaerythritol polyglycidol ether, glycerol polyglycidyl ether, low molecular weight epoxy resins such as epoxy resins of epichlorohydrin and bisphenol A., di- and polyglycidyl esters of acids, polyglycidyl ethers of isocyanurates, such as "Denecol" EX301 from Nagase. Sorbitol polyglycidyl ether, such as Araldite XUGY-358 ® from Ciba-Geigy, and di- and polyglycidyl esters of acids, such as Araldite CY-184 ® from Ciba-Geigy, are preferred since they form high quality finishes.

Glycidyl methacrylate or acrylate containing acrylic polymers can be used such as random and block polymers of glycidyl methacrylate/butyl methacrylate. The block polymers can be prepared by anionic polymerization or by group transfer polymerization.

The hydroxy functional polymeric material has a weight average molecular weight of 3,000 to 20,000 and has multiple hydroxyl groups. The hydroxyl group containing materials can have a hydroxy value of about 50 to 300, and preferably about 75 to 175. Typical, but non-limiting, examples thereof are polymeric polyols such as acrylic polyols, polyester polyols, polyesterurethane polyols, polyether polyols, acrylourethane polyols and a mixture thereof.

The acrylic polyols can be found by polymerizing monomers of alkyl methacrylates or alkyl acrylates or mixtures thereof (where the alkyl groups have 1-12 carbon atoms) and hydroxy functional alkyl (meth)acrylate [where (meth)acrylate can mean either acrylate or methacrylate.] Optionally, the acrylic polyols can contain other components such as styrene, α-methyl styrene, acrylonitrile, methacrylonitrile and the like in amounts about 0.1-50% by weight. Typical alkyl acrylates and methacrylates are discussed above in the description of the anhydride acrylic polymer.

The polyesterurethane polyol is the reaction product of a hydroxyl terminated polyester and a polyisocyanate, preferably, an aliphatic diisocyanate. The urethane has a hydroxyl number of about 75-200 and preferably 100-150 and has a weight average molecular weight of about 3,000 to 25,000 and a number average molecular weight of about 2,000 to 6,000 measured using gel permeation chromatography using polymethyl methacrylate as a standard.

The polyester used to form the polyester urethane is the esterification product of an alkylene glycol, a polyhydric alcohol having at least three hydroxy groups, and an aromatic dicarboxylic acid or its anhydride.

The polyester preferably has a hydroxyl number of 100 to 200.

Typical polyisocyanates, alkylene glycols, polyhydric alcohols and aromatic dicarboxylic acids or its anhydride are discussed in U.S. Pat. No. 4,614,683.

Typical solvents used to prepare the anhydride acrylic polymer and used as a diluent for the coating composition are as follows: toluene, xylene, butyl acetate, ethyl benzene, higher boiling aromatic hydrocarbons, amyl acetate, ethyl acetate, propyl acetate, ethylene or propylene glycol mono alkyl ether acetates.

In addition to the solvents listed above, certain alcoholic solvents are also useful. The alcoholic solvents under certain use conditions convert portions of the anhydride to a half ester also useful as reactants in this system. Examples of such alcohols are propanol, isobutanol, methanol, isopropanol, tertiary butanol, n-butanol, propylene glycol monomethyl ether, ethylene glycol monobutyl ether, and other alcoholic solvents.

About 0.1-5% by weight, based on the weight of the binder of the coating composition, of a catalyst is added to enhance curing of the composition. Typical catalysts are as follows: triethylene diamine, quinuclidine, dialkyl alkanol amines such as dimethyl ethanolamine, diethyl ethanol amine, dibutyl ethanol amine, diethyl hexanol amine and the like, lithium tertiary butoxide, tri(dimethylaminomethyl)phenol, bis(dimethylamino)propan-2-ol, N,N,N$^1$,N$^1$-tetramethylethylenediamine, N,methyldiethanolamine, N,N-dimethyl-1,3-propanediamine and 1-dimethylamino-2-propanol or quaternary ammonium salts such as tert-butyl ammonium bromide, benzyl trimethyl ammonium formate and the like. In addition, the catalyst can be incorporated in the polymeric chain by using amino functional alkyl acrylates such as 2-diethyl amino ethyl methacrylate, vinyl pyridine, tert-butyl amino ethyl methacrylate and the like.

The catalyst need not be added to the coating composition. After an article is coated, the article is passed into a chamber containing catalyst vapors. Dimethylethanol amine is a catalyst that can be vaporized and used to cure the composition. Also, to achieve curing, the catalyst can be sprayed with the coating composition using a dual spray gun.

Generally, the composition is applied by conventional techniques such as spraying and electrostatic spraying. The resulting coating can be dried and cured at ambient temperatures or can be cured at elevated temperatures of 60 to 200° C. At ambient temperatures, the coating dries to a tack free condition in about 180 minutes and in about 24 hours the coating is substantially cured. In about 5-7 days, the coating is completely cured. Coatings are applied to form a finish about 0.5-5 mils thick, and preferably 1-2 mils thick. The finish has excellent gloss, good adhesion to substrate, excellent weatherability, and high solids.

To improve weatherability of the clear finish of the coating composition, about 0.1-5%, by weight, based on the weight of the binder, of an ultraviolet light stabilizer or a combination of ultraviolet light stabilizers can be added. These stabilizers include ultraviolet light absorbers, screeners, quenchers and specific hindered amine light stabilizers. Also, about 0.1-5% by weight, based on the weight of the binder, of an antioxidant can be added.

Typical ultraviolet light stabilizers that are useful are as follows:

Benzophenones such as hydroxydodecyclobenzophenone, 2,4-dihydroxybenzophenone, hydroxy-benzophenones containing sulfonic acid groups, 2,4-dihydroxy-3',5'-di-t-butylbenzophenone, 2,2',4'-trihydroxybenzophenone esters of dicarboxylic acids, 2-hydroxy-4-acryloxyethoxybenzophenone, aliphatic mono-esters of 2,2',4-trihydroxy-4'-alkoxybenzophenone, 2-hydroxy-4-methoxy-2,-carboxybenzophenone;

Triazoles such as 2-phenyl-4-(2,-4,-dihydroxybenzoyl)triazoles, substituted benzotriazoles such as hydroxyphenyltriazoles such as 2-(2'hydroxy-5'-methylphenyl) benzotriazole, 2-(2'hydroxyphenyl)benzotriazole, 2-(2'-hydroxy-5'-octylphenyl)naphthotriazole;

Triazines such as 3,5-dialkyl-4-hydroxyphenyl derivatives of triazine, sulfur-containing derivatives of dialkyl-4-hydroxyphenyltriazines, hydroxyphenyl-1,3,5-triazines and such triazines containing sulfonic acid groups, aryl-1,3,5-triazines, orthohydroxyaryl-s-triazine;

Benzoates such as dibenzoate of diphenylolpropane, t-butyl benzoate of diphenylolpropane, nonyl phenyl benzoate, octyl phenyl benzoate, resorcinol dibenzoate.

Other ultraviolet light stabilizers that can be used include lower alkyl thiomethylene-containing phenols, substituted benzenes such as 1,3-bis(2'-hydroxybenzoyl)benzene, metal derivatives of 3,5,-di-t-butyl-4-hydroxyphenylpropionic acid, asymmetrical oxalic acid diarylamides, alkylhydroxyphenylthioalkanoic acid esters, dialkylhydroxyphenylalkanoic acid esters of di- and tri-pentaerythritol, phenyl- and naphthlenesubstituted oxalic acid diamides, methyl-$\beta$-(3,5-di-t-butyl-4-hydroxyphenyl)propionate, $\alpha,\alpha'$-bis(2-hydroxyphenyl)diisopropylbenzene, 3,5'-dibromo-2'-hydroxyacetophenone, ester derivatives of 4,4-bis(4'-hydroxyphenyl)pentaonic acid wherein there is at least one unsubstituted position ortho to the aromatic hydroxyl groups, organophosphorus sulfides such as bis(diphenyl-phosphinothioyl)monosulfide and bis(diphenylphosphinothioyl)disulfide, 4-benzoyl-6-(dialkylhydroxybenzyl)resorcinol, bis(3-hydroxy-4-benzoylphenoxy)-diphenylsilane, bis(3-hydroxy-4-benzoylphenoxy)dialkylsilane, 1,8-naphthalimides,$\alpha$-cyano- $\beta,\beta$-diphenylacrylic acid derivatives, bis(2-benzoxazolyl)alkanes, bis(2-naphthoxazolyl)alkanes, methylene malonitriles containing aryl and heterocyclic substitutes, alkylenebis(dithio)carbamate, 4-benzoyl-3-hydroxyphenoxyethyl acrylate, 4-benzoyl-3-hydroxyphenoxyethyl methacrylate, aryl or alkyl-substituted acrylonitriles, 3-methyl-5-isopropylphenyl-6-hydroxycourmarone, 8-acetyl-3-dodecyl-7,7,9,9-tetramethyl-1,3,8-triazasprio(4,5)decanol-2,4-dione.

Particularly useful ultraviolet light stabilizers that can be used are hindered amines of piperidyl derivatives such as those disclosed in Murayama et al., U.S. Pat. No. 4,061,616, issued Dec. 6, 1977, column 2, line 65, through column 4, line 2, and nickel compounds such as [1-phenyl-3-methyl-4-decanoylpyrazolate(5)]-Ni, bis[-phenyldithiocarbamato]-Ni(II), and others listed in the above patent, column 8, line 44 through line 55.

The following blend of ultraviolet light stabilizers can be used: 2-[2'-hydroxy-3',5'-1(1-1-dimethyl-propyl)-phenyl]benzotrizole and bis-[4-(1,2,2,6,6-pentamethyl-piperidyl)] 2-butyl-2-[(3,5-t-butyl-4-hydroxyphenyl)-methyl] propanedioate. The stabilizers can be sued in any ratio however, a 1:1 ratio of benzotriazole to propanedioate is preferred.

Another useful blend of ultraviolet light stabilizers is 2-(benzotriazole-2-VL)-4,6-bis(methyl-ethyl-1-phenyl ethyl)phenol, and 2(3 hydroxy-3,5'-ditert amyl phenyl) benzotriazole.

Generally, when the coating composition of this invention is used as a clear coating, it is applied by conventional spraying techniques, to a color or base coat of an automobile or truck, preferably, electrostatic spraying is used. The coatings are baked at about 60° to 140° C. for about 10 to 40 minutes. In refinishing automobiles and trucks, the clear coating is applied to a color coat and then can be dried at ambient temperatures or baked to form a clear finish. The resulting clear coat or finish is about 1-5 mils thick, preferably 1-2 mils thick, and has excellent gloss, good adhesion to the color coat and excellent weatherability.

The composition can be pigmented to form a colored finish or primer. About 0.1-200% by weight, based on the weight of the binder, of conventional pigments can be added using conventional techniques in which a mil base containing pigment, dispersant and solvent is first formed. The mill base is then mixed with the composition to form a colored composition. This composition can be applied and cured as shown above.

The following examples illustrate the invention. All parts and percentages are on a weight basis unless indicated otherwise. Molecular weights are determined by gel permeation chromatography using polymethyl methacrylate as the standard.

EXAMPLE 1

Anhydride Acrylic Polymer

The following constituents were charged into a reactor with a thermometer, stirrer, dropping funnel, nitrogen induction tube and condenser:

|  | Parts by Weight |
|---|---|
| Portion 1 | |
| Xylene | 182.4 |
| Butyl Acetate | 20.2 |
| Portion 2 | |
| Methylmethacrylate Monomer | 96.0 |
| Butylacrylate Monomer | 293.4 |
| Xylene | 10.0 |
| Portion 3 | |
| Itaconic Acid | 167.2 |
| Xylene | 59.8 |
| Portion 4 | |
| T-Butylperacetate | 26.7 |

-continued

| | Parts by Weight |
|---|---|
| Butyl Acetate | 10.6 |
| Xylene | 6.7 |
| Total | 973.0 |

Portion 1 was charged to the reactor, covered with a nitrogen blanket and heated to its reflux temperature (approximately 135° C). Portion 2 is added dropwise over a 180 minute period. Portion 3 is added simultaneously with portions 2 and 4 over a 180 minute period as five minute increment shots of solid itaconic acid followed with washings of xylene. Portion 4 was premixed and added dropwise simultaneously with portions 2 and 3 over a 200 minute period. The resulting composition is then held at reflux until 22 pounds of water per 100 gallon batch size are removed.

The resulting polymer composition had a weight solids content of 64–66% and the polymer had a Gardner-Holdt viscosity of X-Z2. The polymer had a weight average molecular weight of 3500.

Hydroxy Functional Polymer "A"

The following constituents were charged into a reactor equipped with a thermometer, stirrer, dropping funnel, nitrogen induction tube and condenser.

| | Parts by Weight |
|---|---|
| Portion 1 | |
| Methyl Amyl Ketone | 170.9 |
| Portion 2 | |
| Methyl Amyl Ketone | 61.9 |
| 75% Tert-Butylperacetate in mineral spirits | 27.7 |
| Portion 3 | |
| Styrene | 143.9 |
| Ethyl methacrylate | 143.9 |
| Lauryl methacrylate | 115.1 |
| Hydroxyethylacrylate | 172.6 |
| Total | 863.0 |

Portion 1 was charged into the reaction covered with a nitrogen blanket and heated to its reflux temperature (approximately 149–154° C.). Portion 2 was premixed and added dropwise to the reactor over a 165 minute period. Portion 3 was premixed and added dropwise to the reactor over a 150 minute period beginning at the same time that Portion 2 is added. After the addition of Portions 2 and 3, it was held under reflux (approximately 1 45–155° C.) for a 120-minute period and then cooled to 50–60° C. and filter pressed.

The resulting polymer had a weight solids content of 69–71% and a Gardner-Holdt viscosity of Z-1 to Z-3. The polymer had a weight average molecular weight of 12,000.

Coating compositions were prepared by thoroughly blending the following constituents:

| | Parts by Weight |
|---|---|
| Part 1 | |
| Hydroxy Functional Polymer "A" (prepared above) | 111.7 |
| DABCO ® (triethylenediamine from from Air Products Corp.) | 3.2 |
| Tinuvin 328 ® (UV absorber from Ciba-Geigy) | 4.3 |
| Tinuvin 144 ® (hindered amine light stabilizer from Ciba-Geigy) | 4.3 |
| Butyl Alcohol | 13.8 |
| Xylene | 77.2 |
| Propyleneglycolmonomethyletheracetate (PM acetate) | 16.4 |
| Hexylacetate | 16.4 |
| Butylacetate | 41.8 |
| Part 2 | |
| Araldite CY184 ® (Epoxy Resin from Ciba-Geigy) | 21.3 |
| Denecol EX622 ® (Epoxy Resin from Ciba-Geigy) | 21.3 |
| Ethylacetate | 4.7 |
| Part 3 | |
| Anhydride Acrylic Polymer (prepared above) | 145.0 |
| Total | 481.4 |

Just prior to application, the above parts were premixed. The resulting coating composition was reduced further with 90 parts of butyl acetate to a Zahn Cup No. 1 viscosity of 31 seconds. It was then sprayed onto a primed metal panel coated with a pigmented acrylic lacquer. The composition cured at ambient temperature and provided a clear coat with excellent hardness, resistance to gas and water, low yellowing, good acid spot resistance, solvent resistance and good Florida durability.

EXAMPLE 2

Hydroxy Functional Polymer "B"

A hydroxy functional polymer was prepared by charging the following constituents into a reactor equipped with a thermometer, stirrer, dropping funnel, nitrogen induction tube and condenser:

| | Parts by Weight |
|---|---|
| Portion 1 | |
| Xylene | 1980.0 |
| Portion 2 | |
| Methylmethacrylate | 710.0 |
| Hydroxyethylacrylate | 1420.0 |
| Styrene | 710.0 |
| Butyl acrylate | 1890.0 |
| Xylene | 1495.0 |
| Portion 3 | |
| Xylene | 302.0 |
| t-Butylperacetate | 220.0 |
| Total | 8727.0 |

Portion 1 was charged into the reactor, covered with a nitrogen blanked and heated to its reflux temperature. Portions 2 and 3 were charged into the reactor starting at the same time. Portion 2 was added dropwise continuously over a period of 225 minutes while maintaining reflux. Portion 3 was added dropwise continuously over a period of 240 minutes. After completing the charge of portion 3 the reactor was held at reflux for an additional 15 minutes. 1500 parts of xylene were distilled out and the composition was allowed to cool.

The resulting polymer had a weight solids content of 67–70% and a Gardner-Holdt viscosity of Y to Z-1. The polymer had a weight average molecular weight of 8,000.

A coating composition was prepared by thoroughly mixing the following components:

| | Parts by Weight |
|---|---|
| Anhydride Acrylic polymer (as prepared in Example 1) | 19.6 |
| Hydroxy functional polymer "B" (Prepared above) | 3.5 |
| Butyl acetate | 13.3 |
| Araldite CY-184 ® | 4.2 |
| 15.5% dimethylethanol amine in xylene | 3.9 |
| Total | 44.5 |

The resulting coating composition was reduced to a spray viscosity of 35 seconds measured with a No. 2 Zahn cup accomplished by adding butyl acetate.

The coating composition was sprayed onto a primed metal panel coated with a pigmented waterborne base coat. The composition was cured at 180-200° F. and provided a clear coat with excellent color, durability, humidity resistance and film properties. The coating composition was also sprayed over a solvent borne melamine cured base coat and cured at 240-285° F. The resulting coating exhibited excellent color, durability, humidity resistance and other film properties.

EXAMPLE 3

A polyester resin with hydroxy functionality was prepared by reacting the following constituents in a polymerization vessel with a water separator and using reaction temperatures and times as are conventionally used to make polyester resins:

| | Parts by Weight |
|---|---|
| 1,3-Butylene glycol | 120.41 |
| Xylene | 11.10 |
| 1,6 Hexane diol | 145.79 |
| Trimethylol propane | 70.41 |
| Isophthalic acid | 140.31 |
| Water | 44.44 |
| Xylene | 21.79 |
| Ethylene glycol monoethyl ether acetate | 249.10 |
| Total | 1073.36 |
| Water loss* | 133.36 |
| Yield | 940.00 |

*Water loss includes water that was added to fill the water separator

The resulting polyester resin solution had a weight solids content of about 70% and a Gardner-Holdt viscosity measured at 25° C. of about W-Z. The polyester resin had a molar percentage of constituents of 9.4% trimethylol propane, 22.1% 1,6 hexanediol, 24.4% 1,3-butylene diol and 44.3% isophthalic acid. The polyester resin had an acid no. of 6.5-8.5, a hydroxyl number of 130-155, a Mn (number average molecular weight) of 1400 and a Mw (weight average molecular weight) of 4,000.

A polyester urethane resin solution was prepared by reacting the following constituents using conventional reaction times and temperatures:

| | Parts by Weight |
|---|---|
| Polyester resin solutions (Prepared above) | 291.62 |
| Polycaprolactone triol | 264.59 |
| Ethylene glycol monoethyl ether acetate | 52.46 |
| Slow aromatic hydrocarbon solvent | 199.85 |
| 1,6 Hexamethylene diisocyanate | 47.48 |
| Total | 856.00 |

The resulting polyester urethane resin solution had a weight solids content of 60% and a Gardner-Holdt viscosity measured at 25° C. of about X-Y. The polyester urethane had a molar percentage of constituents of 24% polyester, 38.7% polycaprolactone triol and 37.3% 1,6 hexamethylene diisocyanate, acid no. of 2.4-4.0, hydroxyl no. 85, Mn, 3,700 and Mw 19,600.

A coating composition was prepared by thoroughly blending together the following constituents:

| | Parts by Weight |
|---|---|
| Anhydride acrylic polymer (as prepared in Example 1) | 23.0 |
| Polyesterurethane resin with hydroxy functionality (as prepared above) | 6.7 |
| Butyl acetate | 5.0 |
| PM acetate | 3.0 |
| Araldite CY-184 ® | 9.6 |
| 15% dimethylethanolamine in propanol | 5.3 |
| Total | 52.6 |

The resulting coating composition was reduced to a spray viscosity of 35 seconds measured with a No. 2 Zahn Cup accomplished by adding butyl acetate.

The coating composition was sprayed onto a primed metal panel coated with a waterborne basecoat and cured at 180-200° F. and provided a clear coat with excellent color, durability, humidity resistance and film properties. The coating composition was also sprayed over solvent borne melamine cured base coat and cured at 240-295° F. The resulting coating exhibited excellent color, durability, humidity resistance and other film properties.

EXAMPLE 4

Hydroxy Functional Polymer "C"

A hydroxy functional polymer was prepared when the following constituents were charged into a reactor with a thermometer, stirrer, dropping funnel, nitrogen induction tube and condensor:

| | Parts by Weight |
|---|---|
| Portion 1 | |
| Tris amino oil of linseed oil fatty acid | 55.58 |
| Methyl methacrylate | 20.65 |
| Butyl methacrylate | 16.96 |
| Hydroxy ethyl acrylate | 6.36 |
| 2-diethylamino ethyl methacrylate | 1.05 |
| Xylene | 110.87 |
| Portion 2 | |
| Butyl acetate | 25.10 |
| Portion 3 | |
| Xylene | 2.25 |
| 2-mercapto ethanol | 2.12 |
| Butyl acetate | 17.00 |
| Portion 4 | |
| Tris amino oil of linseed oil fatty acid | 23.85 |
| Butyl methacrylate | 152.58 |
| Hydroxy ethyl acrylate | 57.21 |
| 2-Diethylamino ethyl methacrylate | 9.54 |
| Methyl methacrylate | 185.96 |
| Portion 5 | |
| Xylene | 92.36 |

| | Parts by Weight |
|---|---|
| Cyclohexane carbonitrile, 1,1'-azobis | 12.60 |
| Portion 6 | |
| Butyl acetate | 31.83 |
| Xylene | 15.11 |
| Total | 839.00 |

Portion 1 was charged to the reactor, covered with a nitrogen blanket and heated to its reflux temperature. Portion 2 is then added to the reactor. The xylene in Portion 5 was heated to 30° C. in a premix container before adding the cyclohexane carbonitrile, 1,1'-azobis. After reflux, 10% of Portion 5 was added to the reactor and held two minutes. Portions 3 an 4 were premixed and added simultaneously to the reactor over a 120 minute period along with 67% of Portion 5. The remaining 23% of Portion 5 was added to the reactor over a 90 minute period. The entire mixture was held 30 minutes while maintaining reflux. The resulting polymer was reduced to solids by adding Portion 6.

The resulting polymer had a weight solids content of 59.5-60.5 and Gardner-Holdt viscosity of Y-Z. The polymer had a weight average molecular weight of 15,000-17,000.

A white dispersion was prepared by mixing the following constituents into a blend tank:

| | Parts by Weight |
|---|---|
| Portion 1 | |
| Hydroxy functional polymer "C" prepared above) | 10.50 |
| Solvent mixture of 5.00 weight % primary amyl acetate, 23.75 weight % butyl acetate and 71.25 weight % xylene | 10.22 |
| Portion 2 | |
| TiO$_2$ White pigment | 56.39 |
| Portion 3 | |
| Hydroxy Functional Polymer (prepared above) | 18.38 |
| Solvent mixture (described above) | 2.51 |
| Anti-settling clear dispersion consisting of 20 parts anti-Terra-U ® from BYK Mallinckrodt, 3 parts ethylene glycol, 67 parts xylene and 10 parts Bentone 34 ® from N.L. Industries | 2.00 |

Portion 1 was added to the blend tank while mixing at low speed and then mixed for 10 minutes at low speed. Portion 2 was added to the blend tank while mixing at low speed and then mixed at high speed for 20 minutes. Portion 3 was added to the blend tank while mixing at low speeds and then mixed at high speed for 20 minutes after the last addition. The resulting blend was put through a sand mill for fineness.

A coating composition was prepared by thoroughly blending together the following components:

| | Parts by Weight |
|---|---|
| Portion 1 | |
| White Dispersion (prepared above) | 153.4 |
| Denecol EX-622 ® (Nagase) Epoxy Ether | 28.3 |
| Araldite CY-184 ® (Ciba-Geigy) Epoxy Ester | 15.1 |
| Silicone SF-69 ® (General Electric) Silicone Oil | 0.2 |
| Modaflow ® (Monsanto) Acrylic Resin Modifier | 0.4 |
| BYK-300 ® (BYK-Mallinckrodt) Silicone Resin | 0.4 |
| Portion 2 | |
| Anhydride Acrylic Polymer (as prepared in Example 1) | 135.0 |
| Portion 3 | |
| DABCO ® (Air Products) Triethylene Diamine | 1.7 |
| Dimethylethanol Amine | 1.7 |
| Tinuvin 292 ® (hindered amine light stabilizer from Ciba-Geigy) | 1.7 |
| Tinuvin 328 ® (UV abosorber from Ciba-Geigy) | 1.7 |
| Xylene | 80.4 |
| Total | 420.0 |

The resulting coating composition had a weight solids content of 60% and Stormer viscosity of 59KU. The coating composition was psrayed onto a primed metal panel and exhibited excellent gloss, hardness, and adhesion after 24 hours ambient cure. Final cure resulted after 10 days, at which time the coating composition was hard and resisted over 100 double methyl ethyl ketone solvent rubs. This coating also displays outstanding gloss retention and salt spray/humidity resistance.

We claim:

1. A coating composition having a hard, glossy and tack free finish comprising 20-80% by weight of reactive binder components and 80-20% by weight of an organic liquid carrier; wherein the binder comprises
   (a) 25-90% by weight, based on the weight of the binder, of an anhydride acrylic polymer having at least two reactive anhydride groups and consists of polymerized monomers of an ethylenically unsaturated anhydride or an ethylenically unsaturated dicarboxylic acid and polymerized monomers selected from the group consisting of alkyl methacrylate, alkyl acrylate and any mixtures thereof, wherein the alkyl groups have 1-8 carbon atoms and the polymer has a weight average molecular weight of about 2,000-50,000;
   (b) 5-50% by weight, based on the weight of the binder, of a glycidyl component having at least two reactive glycidyl groups;
   (c) 5 to 50% of a polymeric component containing multiple hydroxy groups and no glycidyl groups, selected form the group consisting of acrylic polyols, polyester polyols, polyesterurethane polyols, polyether polyols, acrylourethane polyols and any mixtures thereof; and having a weight average molecular weight of about 3,000 to 20,000; and
the composition contains about 0.1-5% by weight, based on the weight of the binder, of a catalyst and a maximum of 25% based on the weight of the binder of an aromatic vinyl; wherein components (a), (b), and (c) are three separate components.

2. The coating composition of claim 1 in which the glycidyl component is selected from the group consisting of polyglycidyl ether of low molecular weight polyol, epoxy resins of epichlorohydrin and bisphenol A, polyglycidyl ester of polyacids, polyglycidyl ethers of isocyanurates, glycidyl methacrylate or glycidyl acrylate containing acrylic polymer or compatible mixture of any of the above.

3. The coating composition of claim 1 in which the anhydride acrylic polymer contains about 0.1-50% by weight of monomers selected from the group consisting of styrene, acrylonitrile, methacrylonitrile and any mixtures thereof.

4. The coating composition of claim 1 in which the anhydride acrylic polymer has a glass transition temperature of 0 to 75° C. and a weight average molecular weight of about 3,000–25,000.

5. The coating composition of claim 1 in which the anhydride acrylic polymer consists essentially of 20–40% by weight, based on the weight of the acrylic polymer of methyl methacrylate, styrene or mixture of methyl methacrylate and styrene, 35–55% by weight of an alkyl methacrylate or an alkyl acrylate having 2–4 carbon atoms in the alkyl group and 5–55% by weight of polymerizable ethylenically unsaturated anhydride or ethylenically unsaturated discarboxylic acid.

6. The coating composition of claim 1 in which the polymeric component containing multiple hydroxy groups is a polymer comprising polymerized monomers of a hydroxy alkyl methacrylate or hydroxy alkyl acrylate and polymerized monomers selected from the group consisting of alkyl methacrylate, alkyl acrylate and any mixtures thereof, wherein the alkyl groups have 1–12 carbon atoms and the polymer has a weight average molecular weight of about 3,000 to 20,000.

7. The coating composition of claim 6 in which the polymeric component containing multiple hydroxy groups contains about 0.1 to 50% by weight of monomers selected from the group consisting of styrene, acrylonitrile, methacrylonitrile and any mixtures thereof.

8. The coating composition of claim 6 in which the catalyst is incorporate in a polymeric chain by using amino functional alkyl acrylates or methacrylates.

9. The coating composition of claim 1 in which the polyesterurethane is the reaction produce of a polyisocyanate and a polyester which is the esterification product of an alkylene glycol, a polyhydric alcohol having at least three hydroxyl groups and an aromatic dicarboxylic acid or its anhydride.

10. The coating composition of claim 9 in which the polyesterurethane polyol ha a hydroxyl number of about 75 to 200 and a weight average molecular weight of about 3,000 to 20,000.

11. The coating composition of claim 5 in which the glycidyl component comprises a polyglycidyl ether of a polyol or a di- or polyglycidylester of an acid.

12. The coating composition of claim 11 in which the anhydride acrylic polymer consists of polymerized monomers of methyl methacrylate, butyl acrylate and itaconic acid.

13. The coating composition of claim 11 in which the anhydride acrylic polymer consists of polymerized monomers of butyl acrylate, styrene, maleic anhydride and maleic acid.

14. The coating composition of claim 5 in which the anhydride acrylic polymer consists essentially of polymerized monomers of methyl methacrylate, styrene, butyl acrylate and itaconic anhydride;

the glycidyl component consists essentially of sorbitol polyglycidyl ether or the di- or polyglycidylester of an acid or a mixture thereof and the catalyst is triethylene diamine or dimethyl ethanol amine or a mixture thereof.

15. The coating composition of claim 5 in which the anhydride acrylic polymer consists essentially of polymerized monomers of butyl acrylate, styrene, maleic anhydride and maleic acid;

the glycidyl component consists essentially of sorbitol polyglycidyl ether or the di- or polyglycidylester of an acid or a mixture thereof and the catalyst is triethylene diamine or dimethyl ethanol amine or a mixture thereof.

16. The coating composition of claim 1 containing about 0.11–200% by weight, based on the weight of the binder, or pigment.

17. The coating composition of claim 1 in which the acrylic polymer contains up to about 40% by weight of polymerized monomers selected from the group consisting of alkyl acrylate or alkyl methacrylate having 9–12 carbon atoms in the alkyl groups or mixtures thereof.

* * * * *